United States Patent [19]

Mark

[11] Patent Number: 4,864,576
[45] Date of Patent: Sep. 5, 1989

[54] LOCAL AREA NETWORK SYSTEM

[75] Inventor: Jon W. Mark, Waterloo, Canada

[73] Assignee: University of Waterloo, Waterloo, Canada

[21] Appl. No.: 252,540

[22] Filed: Oct. 3, 1988

Related U.S. Application Data

[63] Continuation of Ser. No. 936,434, Dec. 1, 1986, Pat. No. 4,792,945.

[30] Foreign Application Priority Data

Nov. 29, 1985 [GB] United Kingdom ................ 8529369
Jun. 4, 1986 [CA] Canada .................................. 510820

[51] Int. Cl.$^4$ ............................................. H04J 3/00
[52] U.S. Cl. ................................ 370/85.4; 370/110.1; 370/94.1; 340/825.05
[58] Field of Search ..................... 370/60, 94, 85, 89, 370/110.1, 86, 87, 88; 340/825.05, 825.5, 825.52

[56] References Cited

U.S. PATENT DOCUMENTS

| | | | |
|---|---|---|---|
| 4,602,365 | 7/1986 | White et al. | 370/89 |
| 4,650,581 | 7/1987 | Kozlik et al. | 370/85 |
| 4,652,874 | 3/1987 | Loyer | 370/86 |
| 4,670,873 | 6/1987 | Cour et al. | 370/88 |
| 4,727,539 | 2/1988 | Arita et al. | 370/89 |

OTHER PUBLICATIONS

The Twelvth Biennial Symposium on Communications; 04 Jun. 1984; "Integrated Voice/Data Systems on Welnet"; Mark et al., pp. A.1.0–A.1.4.
Globecan 83, San Diego; Nov./Dec. 1983; "Integrated Voice/Data Services on a Dual Ring Local Area Network"; Mark; pp. 11.1.0–11.1.5.
PCT/GB86/00721 International Search Report.
PCT/GB87/00721 Written Op.

Primary Examiner—Robert L. Griffin
Assistant Examiner—Frank M. Scutch, III
Attorney, Agent, or Firm—Anthony Asquith & Co.

[57] ABSTRACT

The LAN system disclosed is a development of the WELNET (TM) system, in which scheduling arrangement between the stations is controlled by a scheduling channel in the form of a loop, separate from the main information channel. The invention provides for Voice and Data to be integrated on the LAN. On a periodic cycle, scheduling is interrupted, and each station is invited to put a Voice packet on the main channel. When the system goes back to Data, the system is so configured as to resume at the station which was about to transmit Data when the schedule was interrupted for Voice.

4 Claims, 1 Drawing Sheet

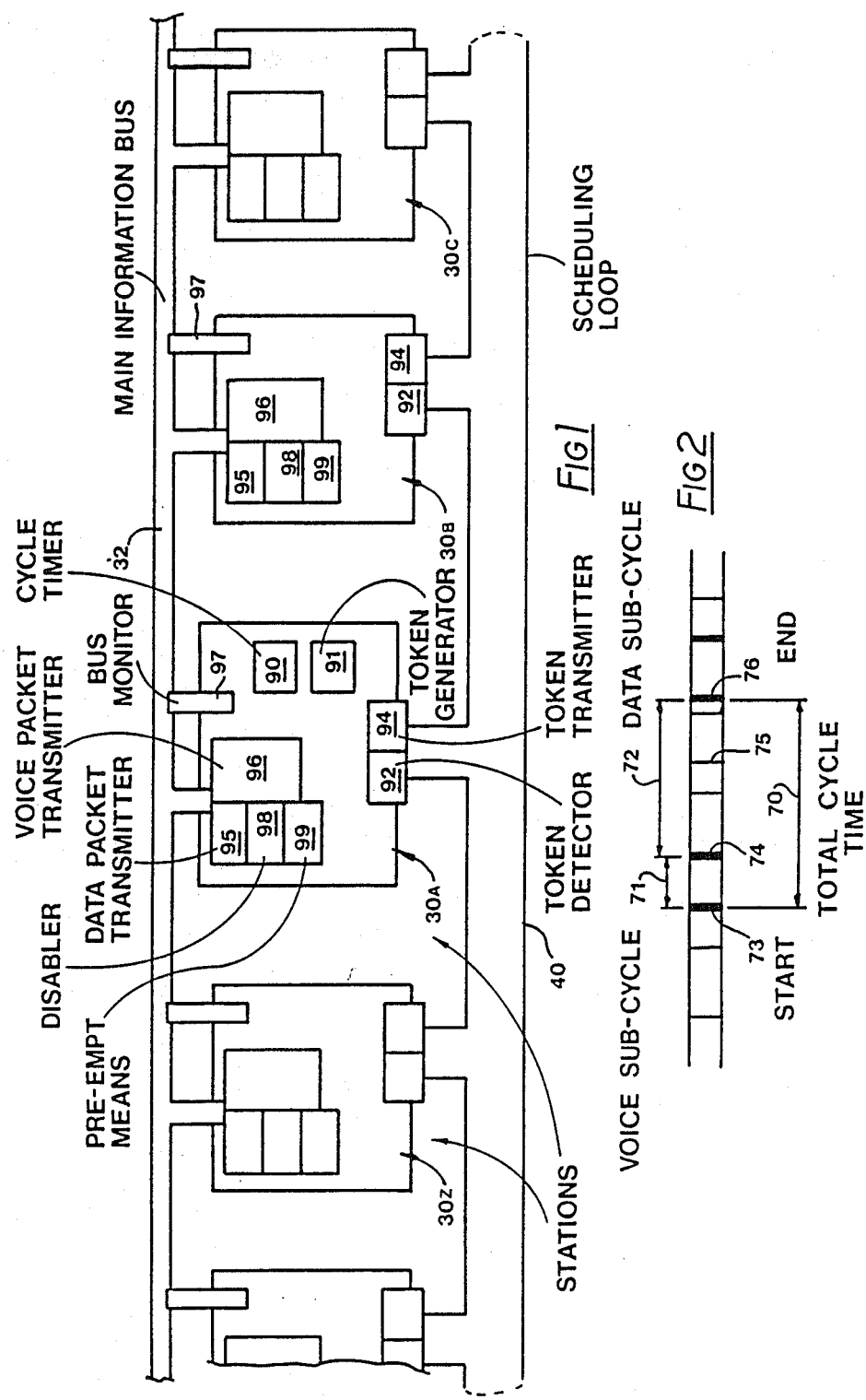

LOCAL AREA NETWORK SYSTEM

This invention is also a continuation of Ser. No. 936434 now U.S. Pat. No. 4,732,945.

This invention relates to Local Area Network (LAN) systems, of the kind used for sending digital information between stations connected to the LAN. In particular, the invention relates to the integration on the LAN of both Voice and Data services.

BACKGROUND TO THE INVENTION

In the type of LAN to which the invention is applicable, there is a main information channel, which may be arranged in a bus configuration. The stations are connected in multidrop fashion to the main information channel, and the information is put onto the main channel in the form of discrete packets.

For a LAN to be suitable for Voice/Data integration, as in the invention, the LAN should be of the kind that incorporates a scheduling procedure. By means of the scheduling procedure, the LAN can be arranged to give each station in turn an opportunity to put Voice packets and Data packets onto the main channel.

In some LANs, the scheduling function is provided by sending the scheduling signals from station to station via the main channel. In other LANs, an extra scheduling channel is provided, which is separate from the main channel, for scheduling.

It is preferred, for the purposes of the invention, that the LAN is of the kind in which the scheduling is done on a separate scheduling channel. If the scheduling were to be done on the main channel, the cheudling signals would have to be intercalated with the information packets and consequently there would be a loss of capacity in the main channel.

The main channel is an expensive item, having the capability of transmitting hundreds of megabits per second. By providing a separate channel for scheduling, the capacity of this expensive channel can be fully utilized. The scheduling channel on the other hand can be quite inexpensive, because the scheduling channel need only transmit the scheduling information, not the packets of information.

It is recognised in the invention that the Welnet (Trademark) LAN System is especially suitable for the integration of Voice and Data. In the Welnet system, a separate scheduling channel is provided. The scheduling channel is in the form of a loop, and the scheduling signals are passed from station to station around the loop. Each station is capable of receiving a scheduling signal only from the station preceding it in the loop, and each station is capable of transmitting a scheduling signal only to the station after it in the loop.

The scheduling signals may be regarded as tokens. Only when a station has the correct token is the station allowed to put its information packet, either a Voice packet or a Data packet, if it has one ready, on to the main channel. Each station has the opportunity to send only one packet of information onto the main channel, when it has the token. The station must then wait until it receives another appropriate token before it can transmit a further packet of information onto the main channel.

In the Welnet system, a station (eg station J) transmits the token to the next station (station K) on the scheduling channel at the same time as station J puts its information packet onto the main channel. Station K, upon receipt of the token, and if it has an information packet to send, monitors the main channel (in fact each station monitors the main channel all the time) and when the main channel is clear, i.e. when the information packet from station J has finished, station K puts its information packet onto the main channel.

In the Welnet system, each station passes the token as soon as that station has started to transmit its packet on to the main information channel. Thus, in a Welnet LAN, the scheduling token and the information packet are sent out at the same time, and in parallel.

In the Welnet LAN, the scheduling channel has a much lower bit-transmission-rat capability than the main channel. A system with a separate scheduling channel, like the Welnet LAN System, would be to some extent uneconomical if the scheduling channel had to be as expensive as the main channel. It is recognized in the invention that, as a result of the relative crudeness of the scheduling channel, the tokens that pass around the scheduling channel should be kept very simple, i.e. very short. If it were to take an appreciable time to transmit the tokens—i.e. if the tokens were to consist themselves of a large number of bits—then the scheduling channel would have to be sophisticated.

It is recognized, in the invention, that the scheduling signals, ie. the token or tokens, therefore should occupy as few bits as possible. The invention lies in recognizing how the small number of bits that are thus available for the tokens can be used to ensure efficient and trouble-free scheduling of integrated Voice and Data services.

GENERAL DESCRIPTION OF THE INVENTION

The invention is applicable not only to the Welnet LAN but is applicable in generally to the type of LAN which includes a relatively low-capacity scheduling channel, in the form of a loop, in addition to the main channel, which may be in the form either of a loop or of a bus. In this specification, however, the invention is explained in relation to the Welnet system.

For good quality speech transmission, priority should be given to the Voice packets. Computer-generated information, ie the Data packets, should, in an integrated system, be transmitted during the pauses between the Voice packets. It is also recognized that, if the traffic on the LAN is heavy, it is the Data packets that should be delayed, not the Voice packets. Transmitted speech would become of noticeably poorer quality if the Voice packets were to be delayed.

It is recognized in the invention that when the Data packets are delayed, to make way for Voice packets, the problem can arise that some of the stations have substantially fewer opportunities, overall, to put Data packets on the main channel than other stations.

The invention provides, in the scheduling function, a means for pre-emptying those stations that have already transmitted Data. The effect is that when the LAN reverts to data, after Voice, the system resumes, not at the leader station each time, but at the station that was next in line to transmit Data.

The provision of this pre-empting facility means that more Voice stations can be present on the LAN, without compromising the transmission of Data. In the invention, none of the stations receives an unfair number of opportunities to transmit Data-packets, at the expense of the other stations, even if there are many Voice stations on the LAN. But without the invention, if the number of Voice stations were high, then the later Data stations on the loop would, at least sometimes, receive markedly fewer opportunities to transmit Data.

The invention permits the cycle time between periods of Voice and Data transmissions to be optimized. In this specification, the "cycle" time is the time between successive rounds of Voice transmissions.

In deciding what the cycle time should be, the following factors should be borne in mind:

1. A burst of speech at a station, having been digitized, can be transmitted on the main channel in a small fraction of the time it took to make the burst of speech in real time. For example, a 32 kbps voice source can be transmitted on a 10 Mpbs bus in about one three-hundredth of the real speech time.
2. Before each packet can be transmitted on the main channel, station identifier and other signals have to be appended, which represents an overhead. The fact that the overhead is needed suggests to the system designer that the round time should be long, so that the information part of the packet is long compared to the overhead. From this standpoint, the cycle time should be as long as possible, so that the time spent on the non-information part of the transmission is only a small proportion of the total time the station occupies the main channel.
3. From a speech quality point of view, the time-interval between the Voice packets should not exceed about 20 milliseconds, otherwise the delay becomes noticeable to the people who are conversing. Sometimes, however, as low quality of speech transmission can be tolerated, at least temporarily, in which case the cycle time can be 50 milliseconds, or even more. A typical value, for normal good quality speech transmission, would be in the 10 to 20 millisecond range. Also from the speech-quality point of view, the variation on the delay should be kept as small as possible.

DETAILED DESCRIPTION OF A PREFERRED EMBODIMENT OF THE INVENTION

An example of a Local Area Network, set up to incorporate the invention, will now be described with reference to the accompanying drawings, in which:

FIG. 1 is a diagram of the physical layout of the LAN;

FIG. 2 is a timing diagram of the cyclic events at one of the stations on the LAN.

The LAN system shown in FIG. 1 is based on a Welnet (TM) system, and includes several stations 30, connected to a main information channel (which in this case is in the form of a bus 32) in parallel, or multidrop fashion.

Each station 30 is connected also to a scheduling channel, which is in the form of a ring or endless-loop 40.

One 30A of the stations 30 is designated the leader-station, and this station includes a cycle-timer 90. The leader-station 30A also includes a token-generator 91, which is effective to put a number of kinds of tokens onto the scheduling loop 40.

The arrangement of the system is such that the leader-station 30A can pass tokens only to station 30B. Station 30B can pass tokens only to station 30C, and so on. Similarly, each station can receive tokens only from the preceding station on the loop 40. The leader-station 30A can receive tokens only from station 30Z. The leaderstation has no direct communication with the stations on the scheduling loop 40, other than by means of the tokens which are passed from station to station.

Each station 30 includes a token-detecting-means 92, which is effective to detect the fact that a token has arrived at the station 30. The token detecting-means 92 is effective also to determine which of four types the arriving token is, namely: a Null-token, a Voice-token, a Data-token, and a Preemt-token. The fact that there are only four tokens means that the four tokens can be represented by just one pair of binary digits (bits), i.e. 00, 01, 10, and 11.

The token-generator 91 at the leader-station 30A is effective to generate the four different kinds of token. each station 30 includes a respective means to generate a Preempt token, under the circumstances as will be explained below.

Each station includes a token-transmitting-means 94, which is effective to pass the token on to the next station on the loop 40.

At least some of the stations include a Data-packet-transmitting-means 95, which, when scheduled to do so, is effective to transmit the station's next Data packet onto the main bus 32. Some of the stations 30 also include a respective Voice-packet-transmitting-means 96, which similarly is effective, when scheduled to do so, to transmit the station's next Voice-packet onto the bus 32.

The basic operation of the Welnet LAN system may be described as follows.

At the start of the cycle, the leader 30A issues first a Null-token, the purpose of which will be discussed below. The Null-token travels straight round the loop 40, from station to station, until the Null-token arrives back at the leader-station 30A. It may be taken that the circulation time of the Null-token is practically instantaneous.

Upon the return of the Null-token, the leader-station 30A issues a Voice-token, which travels along the loop 40 until it arrives at the next station to the leader, station B. If station B has a Voice packet to transmit, the Voice transmitting-means 96B of station B now puts that Voice-packet onto the bus 32. At the same time, the tokentransmitting-means 94B of station B sends the Voice-token onto the scheduling loop 40.

The Voice-token arrives at station C. Each station includes a bus monitoring-means 97, which constantly monitors the bus, to determine, among other things, whether the bus is clear. The Voice-token therefore remains at station C until station B has finished with the bus. Then, when the bus is clear, station C puts its own Voice-packet onto the bus, and, once station C's Voice-packet is established on the bus, station C transmits the Voice-token to the next station. This procedure continues until the Voice-token arrives back at the leader station 30A.

If any station happens not to have a Voice-packet to transmit, the token detecting-means 92 and the token transmitting-means 94 of that station act to pass the Voice-token straight on around the loop 40 to the next station.

When the Voice-token arrives back at the leader station 30A, the Voice sub-cycle is finished. Next, the token generator 91 at the leader station puts a second Null-token onto the loop 40.

It may be noted that the Voice-token travels around the loop just once during the Voice sub-cycle. The time taken to complete the Voice sub-cycle depends on how many of the stations have transmitted a respective Voice-packet.

The Data sub-cycle now starts, and the leader-station puts out a Data-token. The effect of the Data-token on the stations corresponds to the effect of the Voice-token, in that the token-detecting-means 92 detects the arrival of the Data-token, and triggers the Data-packet-transmitting-means 95 of the station to put a Data-packet, if there is one waiting at that station, onto the bus.

When the Data-token arrives back at the leader-station 30A, the token-generator 91 at the leader-station transmits a further Data token onto the scheduling loop 40, which similarly circulates from station to station around the loop. And, as long as the cycle timer 90 indicates that there is still time left in the current cycle, the Data-tokens continue to pass from station to station.

It will be noted that if there is little Voice traffic on the LAN, there is time, within the overall cycle-time, for the Data-token to travel around the loop many times. However, if the Voice traffic is heavy, there may hardly be time for the Data-token to travel around the loop once.

When the timer 90 indicates that the cycle-time is up, the leader-station circulates a further Null-token around the loop, followed by a Voice-token, and the cycle starts again.

If Voice traffic is light, there may be plenty of time left in the Data sub-cycle for, say, 15 or more circulations of the Data-token. That number of circulations or rounds of the Data-token means that each station receives virtually the same number of chances as all the other stations to put its Data-packets onto the bus.

If, however, there is heavy Voice traffic on the bus, there may be time only for, say, 1 or 2 circulations of the Data-token per cycle. Therefore, in the case where there is heavy Voice traffic, it may be inferred that station 30Z and the rest of the later stations in the loop will have significantly fewer opportunities to put their Data-packets onto the bus than stations 30B, 30C, etc at the beginning of the loop.

FIG. 2 is a diagram showing the cycle of operations that take place at the leader-station 30A. In FIG. 2, the total cycle time 70 comprises the Voice sub-cycle 71 and the Data sub-cycle 72. At the start of the cycle, i.e. at point 73, the leader 30A issues a Null-token to station 30B, and receives the Null-token back from station 30Z a moment later. The leader then immediately issues a Voice-token to station 30B.

At point 74, the leader receives the Voice token from station 30Z, sends the Null-token once more around the loop, receives the returning Null-token, and issues the Data-token. This sequence takes place practically instantaneously. The Data-token circulates from station to station, arriving back at the leader 30A at point 75. The Data-token continues to circulate until the cycle timer 90 indicates the end 76 of the cycle. Thereupon, the leader issues the Null-token.

It will again be noted that the later stations on the loop may receive fewer opportunities to put their Data-packets onto the bus 32.

It is recognised in the invention that the limitation imposed by this aspect of operation of such LANs as Welnet, can be eliminated in a very simple, inexpensive manner. The invention provides the Preempt facility, by which all the stations on the LAN receive the same number of opportunities to put Data-packets on the bus. As a result, the invention allows more Voice stations to be included on the LAN, without the expected corresponding deterioration in the quality of the transmitted speech, and without compromising the Data stations.

To effect the Preempt facility, each station 30 is provided with a disabling-means 98. The disabling-means 98 has two states: in the first state, the disabling-means is effective to prevent the Data-packet-transmitting-means 95 of the station from putting a Data packet onto the bus. In the second state, the disabling-means 98 allows the Data-packet-transmitting-means 95 to put the Data-packet onto the bus. In both states, the disabling-means 98 does not affect the ability of the Voice-packet-transmitting-means 96 to put a Voice packet onto the bus.

Each station includes also a Preempt-means 99. The Preemptmeans 99 is responsive to the arrival of the Preempt-token, and the Preempt means is effective to toggle the disablingmeans 98 between the two states.

The operation of the Preempt-means is as follows. When the timer 90 indicates that the cycle is ended, the token generator 91 sends out a Null-token. The Data-token, at this point, when the Null-token is being dispatched, of course is out at one of the stations, eg at station 30K. It is arranged that the Null-token passes unchanged through stations 30B to 30J. When the Null-token reaches station 30K, the Null-token is cancelled, and station 30J issues the Preempt-token, which then continues around the loop 40, from station 30L through to station 30Z, and so back to the leader-station 30A.

Upon receipt of the Preempt-token, the leader station issues the Voice token, to set in motion the Voice stage of the new cycle.

It is arranged that the passage of the Preempt-token through a station is effective to toggle the disabling-means 98 to the second state, i.e. the state where the disabling-means 98 allows the Data transmitting means 95 to put the Data-packet onto the bus 32. It is arranged that the passage of a Data-token through a station, followed in sequence by the passage of a Null-token through the station, is effective to toggle the disabling-means 98 to the first state, i.e. the state where the the disabling-means 98 prevents the Data-transmitting-means 95 from putting a Data-packet onto the bus.

Thus, when the Data stage of the next cycle comes round, the Data token is passed through the stations 30B to 30J, and those stations cannot put Data-packets onto the bus. In the new cycle, the first station to have an opportunity to put a Data-packet onto the bus is station 30K.

This particular manner of effecting the Preempt facility is not the only one contemplated in the invention. It can be arranged that other particular sequences of tokens can be detected at the stations, which will achieve the same function, i.e. the function of resuming Data-packettransmission at the point on the loop where Data-packettransmission was interrupted.

The invention lies in recognizing that when the scheduling channel is so arranged that the stations have access only to the adjacent stations on the loop, as in the Welnet LAN, and have no direct access to the leader, then the Preempt facility is advantageous. It is recognised that the Preempt facility can be carried out, without compromising any other aspects of the performance of the LAN, by using just four different kinds of tokens.

It is recognised also that the Preempt facility can be achieved virtually for nothing. Four tokens need only two bits, and since the scheduling signals on Welnet and similar LANs have to include in any case three kinds of tokens, the fourth token can be accommodated in what amounts to a "spare" pair of bits.

It is not a limitation of the invention that the cycle time should be fixed. The leader station may, for example, include means for adjusting the cycle time in accordance with the traffic, or with other parameters, to achieve optimisation of the LAN. Also, the status of "leader" can be transferred from one station to another, from time to time, as dictated by other needs of the system.

It is not a limitation of the invention that all the scheduling must be done solely on the scheduling loop 40. It will often be the case that there is more than one transmitting device at a station, in which case a certain degree of pre-scheduling, at the station, will be needed.

One of the four tokens used in the Welnet system is the Null-token. The purpose of the Null-token may be explained as follows. If there is noise on the loop, false signals may circulate back to the leader station, and be picked up as tokens. Thus if a spurious Voice-token appears on the loop while the legitimate Voice-token is out on the loop, two stations will be trying to put Voice-packets on the loop at once. This is no problem in itself, since each station monitors the bus, and only one packet can go onto the bus at one time.

The problem is that the leader-station, upon receipt of the Voice-token, will thereupon end the Voice sub-cycle, and will issue a Data-token. The leader cannot distinguish between the spurious Voice-token and the legitimate one. Without the Null-token, scheduling would be very inefficient, because there would be Voice tokens and Data-tokens circulating around the loop together. The Preempting facility of the invention, especially, would therefore not work properly. The action of circulating the Null-token means that a spurious signal cannot last for more than one sub-cycle. The Null-token limits the effect of the presence of a spurious token merely to a momentary slight loss of efficiency.

I claim:

1. Local Area Network (LAN) System, wherein;
the system includes a main information channel;
the system includes many stations, and the stations include respective means for putting digitised information onto the main channel in the form of discrete packets;
the packets from some of the stations sometimes comprise packets of Voice information, and the packets from some of the stations sometimes comprise packets of Data information;
the system includes a scheduling channel in the form of a loop, connected in series from station to station;
each station includes a respective token transmission means, which is effective to transmit a token to the next station in series on the scheduling loop;
the system includes a token generating means;
the said token generating means is effective to generate tokens, and the said token transmission means is effective to transmit tokens, in the form of a pair of binary digits (bits), each digit of the pair having either the value 0 or the value 1;
a pair of bits, received at a station, is in a Voice-token configuration with respect to that station when, in conjuction with the sequence of the preceding pairs of bits received at the station, the receipt of the pair of bits in that configuration causes the station to place an available Voice packet on the main channel;
some of the stations are pre-emptable stations;
the pre-emptable stations are capable of adopting a Data-enabled status, in which the station, upon receipt at the station of a pair of bits in a Data-token configuration, is enabled to place an available Data packet onto the main channel, and the pre-emptable stations are capable also of adopting a Data-disabled status, in which the station, upon receipt at the station of a pair of bits in the Data-token configuration, is disabled from placing an available Data packet onto the main channel;
each pre-emptable station includes a respective status setting means: which is responsive to the receipt at the station of pairs of bits; which is capable of detecting the particular token configuration of the pair of bits; and which is effective to set the status of the station in accordance with the configuration of the received pair of bits in conjunction with the sequence of the preceding pairs of bits received at that station;
a pair of bits, received at a station, is in a Data-disabling token configuration with respect to that station when, in conjuction with the sequence of the preceding pairs of bits received at the station, the status setting means of the station, upon receipt of the pair of bits in that configuration, set the station to the Data-disabled status;
a pair of bits, received at a station, is in a Data-enabling token configuration with respect to that station when, in conjunction with the sequence of the preceding pairs of bits received at the station, the status setting means of the station, upon receipt of the pair of bits in that configuration, set the station to the Data-enabled status;
the system operates in periodic cycles, each cycle comprising a Voice sub-cycle and a Data sub-cycle;
in the Data sub-cycle, the token generating means is effective to issue a pair of bits in Data token configuration onto the scheduling loop, and the token transmission means are effective to pass the Data token from station to station around the loop;
in the Voice sub-cycle, the token generating means is effective to issue a pair of bits in Voice token configuration onto the scheduling loop, and the token transmission means are effective to pass the Voice token from station to station around the loop;
the token generating means includes a timing means, which is effective, after a predetermined time from the start of the cycle, to issue onto the loop a pair of bits in the Data-disabling token configuration;
the system is such that the Data-disabling token is passed from station to station, and is effective to cause the status setting means of each pre-emptable station through which it passes to set the station to the Data-disabled status;
the station which is the last station to have completed placing a Data packet on the main channel when the Data-disabling token passes that station is termed the pre-empted station;
the pre-empted station is effective to issue to the following station on the loop a pair of bits in the Data-enabling token configuration, and that Data-enabling token passes from station to station around the remainder of the loop, and is effective to cause the status setting means of each station through which it passes to set the station to the Data-enabled status;

the token generating means is effective, after the passage of the Data-disabling and Data-enabling tokens around the loop, to initiate a fresh Voice sub-cycle by issuing a pair of bits in Voice-token configuration onto the loop, which is passed from station to station around the loop;

the token generating means is effective, after the passage of the Voice-token around the loop, to initiate a fresh Data sub-cycle, by issuing onto the loop a fresh pair of bits in Data-token configuration, which is passed from station to station around the loop;

whereby the stations up to and including the pre-empted station end the Data sub-cycle in the Data-disabled status, and the stations following the pre-empted station end the Data sub-cycle in the Data-enabled status;

the pre-emptable stations are so arranged that, when the station has been set to the Data-disabled status, the passage through the station of a pair of bits in the Data-token configuration is effective to cause the status setting means to reset the station to the Data-enabled status;

whereby the system has a pre-emptive resume facility, in that the placing of available Data packets onto the main channel resumes, at the start of the fresh Data sub-cycle, at the station following the pre-empted station;

and the status setting means is effective to hold the station in the set status appropriate to the configuration of the pair of bits last received, until a further pair of bits is received at the station.

2. LAN of claim 1, wherein:

one of the stations is designated the leader station, and the token generating means, and the timing means, are located at the leader station;

the system is such that the leader station issues the Voice token upon receipt at the leader station, via the last pre-emptable station on the loop, of the Data-enabling token;

and the system is such that the leader station initiates the Data sub-cycle, by issuing the Data token, after the receipt back at the leader station of the Voice token.

3. LAN of claim 2, wherein:

the Data-disabling token comprises a Null token, and the Data-enabling token comprises a Pre-empt token;

the leader station issues a Null token onto the scheduling loop upon the receipt back at the leader station of the Voice token; and the leader station issues the Data token upon the receipt back at the leader station of the Null token.

4. LAN of claim 1, wherein:

the timing means is arranged to start a fresh Voice sub-cycle about every 20 milliseconds.

* * * * *